(12) United States Patent
McClure

(10) Patent No.: US 10,278,543 B2
(45) Date of Patent: May 7, 2019

(54) SHAKER CONTAINER WITH INNER BEAMS

(71) Applicant: Denver McClure, Corona, CA (US)

(72) Inventor: Denver McClure, Corona, CA (US)

( * ) Notice: Subject to any disclaimer, the term of this patent is extended or adjusted under 35 U.S.C. 154(b) by 0 days.

(21) Appl. No.: 15/681,353

(22) Filed: Aug. 19, 2017

(65) Prior Publication Data

US 2019/0053669 A1 Feb. 21, 2019

(51) Int. Cl.
*A47J 43/00* (2006.01)
*A47J 43/27* (2006.01)
*B65D 81/38* (2006.01)
*A47J 31/44* (2006.01)

(52) U.S. Cl.
CPC .......... *A47J 43/27* (2013.01); *A47J 31/4403* (2013.01); *B65D 81/3865* (2013.01); *B65D 2217/02* (2013.01)

(58) Field of Classification Search
CPC ... A47J 31/4403; A47J 43/27; B65D 81/3865; B65D 2217/02
See application file for complete search history.

(56) References Cited

U.S. PATENT DOCUMENTS

| 4,768,674 A | * | 9/1988 | Prescott | A47G 19/2211 220/719 |
| 6,398,064 B1 | * | 6/2002 | Cornwall | A47G 19/2211 220/731 |
| 8,950,623 B2 | * | 2/2015 | Fleming | B65D 43/02 220/713 |
| 2013/0105520 A1 | * | 5/2013 | Barber | A21C 5/006 222/154 |

* cited by examiner

*Primary Examiner* — Anshu Bhatia
(74) *Attorney, Agent, or Firm* — The Iwashko Law Firm, PLLC; Lev Ivan Gabriel Iwashko

(57) ABSTRACT

A shaker container, including a body to house content therein, a plurality of beams to extend inwardly from an inner surface of the body, and a lid to close an opening of the body at a top portion of the body.

6 Claims, 2 Drawing Sheets

SHAKER CONTAINER WITH INNER BEAMS

BACKGROUND OF THE INVENTION

1. Field of the Invention

The present general inventive concept relates generally to a shaker container having beams disposed therewithin, to facilitate mixing of content disposed within the shaker container.

2. Description of the Related Art

Conventional shaker and/or blender containers have been introduced to the market in order to allow users to bring powder (e.g., protein shake powder, weight loss powder, energy powder, etc.) into a workout environment, such that the powder may be mixed with water, or any other liquid, at the user's convenience. These conventional shaker and/or blender containers, which are typically produced by and/or for the health industry, typically contain a "blender ball" disposed therewithin, in order to facilitate the blending of the powder with the liquid. These "blender balls" are usually small metal spring balls that bounce around on the inside of the container to shake up the powder with the liquid. However, these metal spring balls are very loud, hard to keep clean, often get lost in dishwashers and disposals, and do not always provide the best mixing of the powder and the liquid.

Therefore, there is a need for a shaker container having an insulated body like most "tumbler" cups, which also has a mixing mechanism that provides a superior mixing potential, allows for easier cleaning, and produces a quieter sound.

SUMMARY

The present general inventive concept provides a shaker container having a superior mixing capability.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a shaker container, including a body to house content therein, a plurality of beams to extend inwardly from an inner surface of the body, and a lid to close an opening of the body at a top portion of the body.

Each of the plurality of beams may extend inwardly toward a substantially center portion of the body.

The plurality of beams may be disposed in a spiral configuration from a bottom portion of the body to a top portion of the body.

Each of the plurality of beams may extend from a first portion of the inner surface of the body to a second portion of the inner surface of the body.

The lid may further include a drinking aperture to allow a user to drink the content disposed within the body without removing the lid.

The shaker container may further include a cap assembly secured to a top portion of the lid, the cap assembly comprising a removable cap to cover and seal the drinking aperture.

The body may further include an insulation portion to maintain a warm or cold temperature of content disposed within the body.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE INVENTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
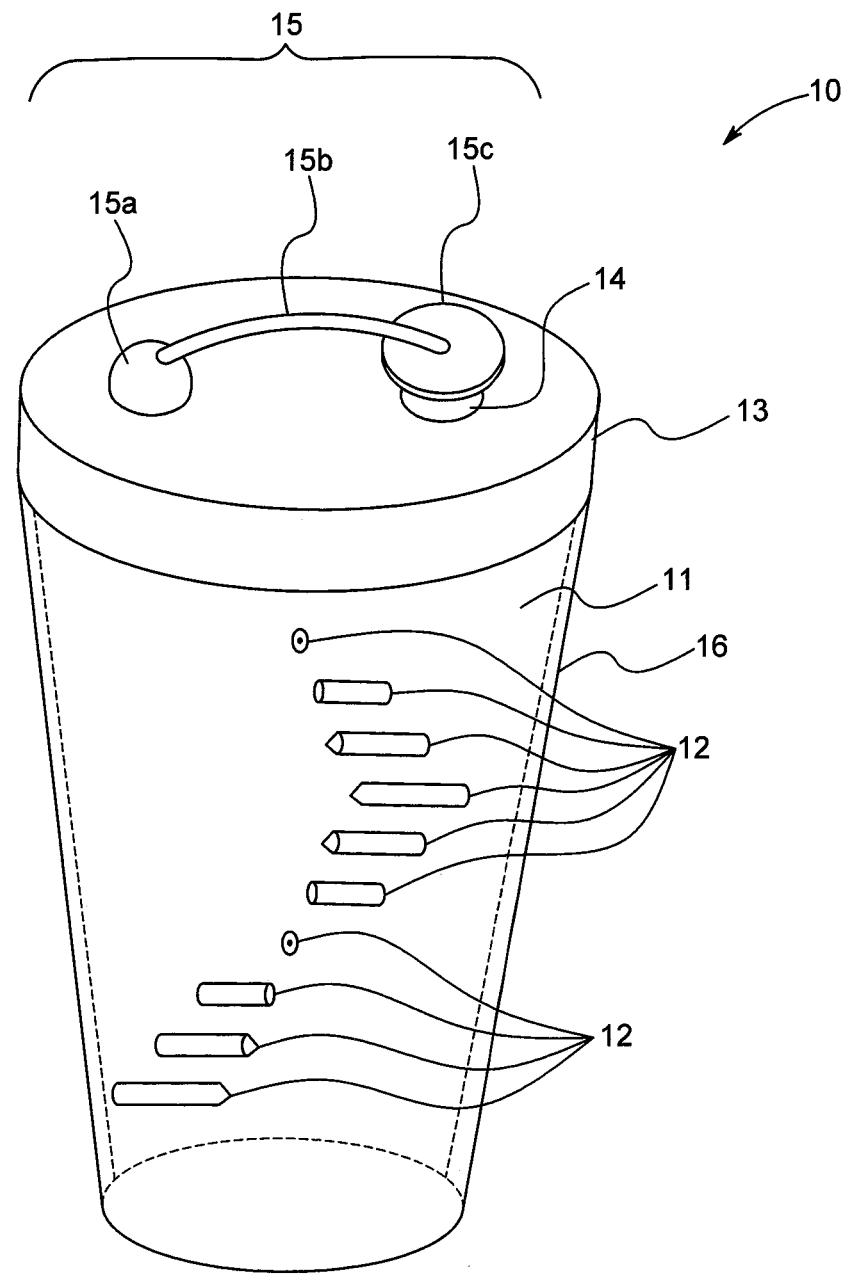
FIG. 1 is an angled view of a shaker container, according to an exemplary embodiment of the present general inventive concept.

FIG. 1 is an angled view of a shaker container 10, according to an exemplary embodiment of the present general inventive concept.

The shaker container 10, and all components included therewith, may be made from BPA-free plastic, metal, rubber, ceramic, or any other type of material known to one of ordinary skill in the art.

Referring to FIG. 1, the shaker container 10 may include a body 11, at least one beam 12, a lid 13, a drinking aperture 14, and a cap assembly 15.

The body 11 may be cylindrical, in shape, octagonal in shape, or may have any other shape desired by a manufacturer. The body 11 may also be opaque or transparent, and may be made from BPA-free plastic, metal, rubber, ceramic, or any other type of material known to one of ordinary skill in the art. The body 11 may be designed to contain content, such as a liquid, power, or any other type of content, therein.

The body 11 may also include an insulation portion 16, which allows the liquid disposed within the shaker container 10 to maintain its warmth or coldness for an extended period of time.

Referring to FIG. 1, the at least one beam 12 may be disposed within the shaker container 10 to extend substantially horizontally from an inner surface of the body 11. However, the at least one beam 12 is not limited to extending substantially horizontally from the inner surface of the body 11, and may alternatively extend in an vertically-angled horizontal direction from the inner surface of the body 11.

The at least one beam 12 may extend all the way from one portion of the inner surface of the body 11, to another portion of the inner surface of the body 11. The at least one beam 12 may also extend partially from the inner surface of the body 11, toward a center portion of the body 11. However, the at least one beam 12 is not limited to the extension directions above, and may be provided in various numbers, configurations, and extension directions, based on a user's preference.

When the at least one beam 12 is provided in plurality, the plurality of beams 12 may be provided in a spiral configuration, as illustrated in FIG. 1. More specifically, the plurality of beams 12 may be disposed in a spiral-staircase-type configuration, starting from a bottom portion of the body 11, and ending at a top portion of the body 11. This particular spiral configuration of the plurality of means 12 may facilitate a mixing of a liquid and a powder disposed within the shaker container 10.

The at least one beam 12 acts as a partial barrier and agitator within the body 11. As such, if there are both a liquid and a powder, for example, disposed within the body 11, the user may shake the shaker container 10 to attempt to thoroughly mix the liquid and the powder together, until they are combined. During the shaking of the shaker container 10, the liquid and the powder hit the various surfaces of the at least one beam 12 (i.e., preferably a plurality of beams 12), causing extra agitation of the liquid and the powder within the body 11, which ultimately results in a superior mixing and combining of the liquid and the powder within the body 11. Therefore, the plurality of beams 12 allow the liquid and the powder within the body 11 to be mixed more quickly and with superior combining.

Referring to FIG. 1, the lid 13 may be included to prevent content disposed within the shaker container 10 from spilling out of the body 11. More specifically, the lid 13 may be removably secured to a top portion of the body 11, in order to cover an opening at the top portion of the body 11. The lid 13 may be a removable lid, snap-on lid, a screw-on lid, or any other type of lid that prevents content from spilling out of the body 11.

The lid 13 may include a drinking aperture 14 to allow a user to drink the contents disposed within the body 11 without removing the lid 13. The drinking aperture 14 may simply be a hole within the lid 13. Alternatively, the drinking aperture 14 may include a protrusion extending perpendicularly from a top surface of the lid 13 to allow a user to wrap his/her lips around the drinking aperture 14, such that the contents within the body 11 are easily drinkable by the user. The protrusion version of the drinking aperture 14 may have a round shape, in order to provide comfort for the user during drinking.

Referring to FIG. 1, the cap assembly 15 includes an anchor 15a, a connector 15b, and a cap 15c.

The anchor 15a may be attached to the lid 13, to allow the cap assembly 15 to be anchored to the lid 13.

The cap 15c may be disposed either within the drinking aperture 14, or may cover the drinking aperture 14, based on the design of the drinking aperture 14, as previously described. The purpose of the cap 15c is to prevent the contents without the body 11 from spilling out of the body 11, while also allowing the user to remove the cap from the drinking aperture 14 to drink the contents without removing the lid 13.

The connector 15b may connect the anchor 15a to the cap 15c, to allow the user to remove the cap 15c without a risk of losing the cap 15c.

Figure 2:
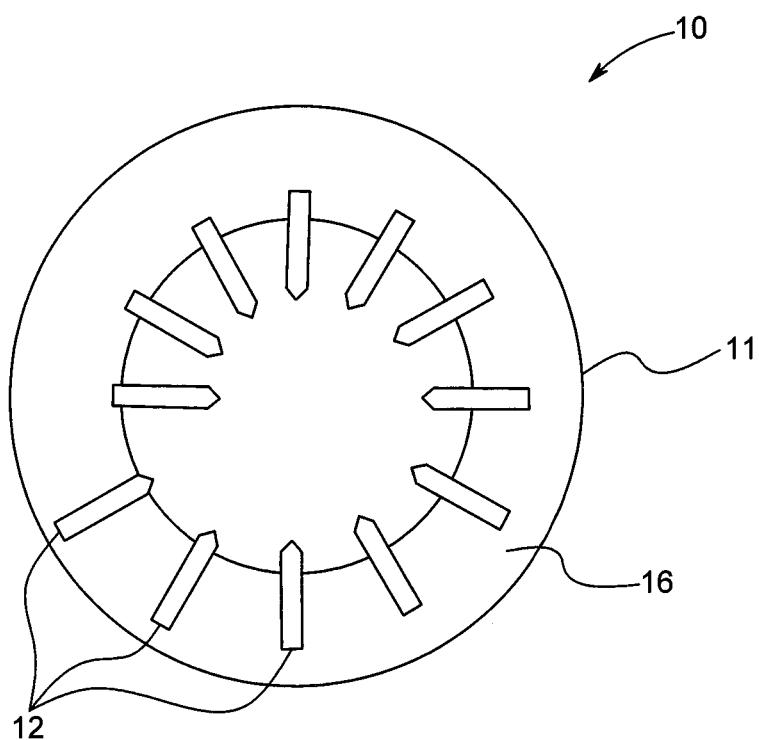
FIG. 2 is a top view of the shaker container without a lid, according to an exemplary embodiment of the present general inventive concept.

FIG. 2 is a top view of the shaker container 10 without the lid 13, according to an exemplary embodiment of the present general inventive concept.

As illustrated in FIG. 2, the shaker container may include the body 11, the at least one beam 12, and the insulation portion 16. The at least one beam 12 is provided in plurality, and it is apparent that the plurality of at least one beams are provided in a spiral configuration from a bottom portion of the body 11 to a top portion of the body 11. Also, the plurality of beams 12 all extend partially from the inner surface of the body 11 to a center portion of the body 11.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A shaker container, comprising:
   a body to house content therein;
   a plurality of beams to extend inwardly from an inner surface of the body to facilitate mixing of contents within the body; and
   a lid to close an opening of the body at a top portion of the body,
   wherein each of the plurality of beams are disposed in a spiral stair-case configuration from a bottom portion of the body to a top portion of the body,
   wherein each of the plurality of beams are distanced from each other at a predetermined distance, such that a space is formed between each adjacent beam.

2. The shaker container of claim 1, wherein each of the plurality of beams extend inwardly toward a substantially center portion of the body.

3. The shaker container of claim 1, wherein each of the plurality of beams extend from a first portion of the inner surface of the body to a second portion of the inner surface of the body.

4. The shaker container of claim 1, wherein the lid further comprises:
   a drinking aperture to allow a user to drink the content disposed within the body without removing the lid.

5. The shaker container of claim 4, further comprising:
   a cap assembly secured to a top portion of the lid, the cap assembly comprising a removable cap to cover and seal the drinking aperture.

6. The shaker container of claim 1, wherein the body further comprises:
   an insulation portion to maintain a warm or cold temperature of content disposed within the body.

\* \* \* \* \*